United States Patent Office 3,227,751
Patented Jan. 4, 1966

3,227,751
METHOD OF PREPARING TRIMELLITIC ACID
Peter Stanley Backlund, Anaheim, Calif., assignor to Union Oil Company of California, Los Angeles, Calif., a corporation of California
No Drawing. Filed June 9, 1961, Ser. No. 115,927
5 Claims. (Cl. 260—524)

This invention relates to the nitric acid oxidation of polyalkylbenzenes to benzene polycarboxylic acids and in particular relation to the oxidation of xylenes and pseudocumene to phthalic acids and trimellitic acid.

The widespread use of synthetic resins and fibers derived wholly or in part from benzene polycarboxylic acids has focused attention on vairous methods for preparation of these acids. A relatively simple and well known preparation method is nitric acid oxidation of hydrocarbon distillates rich in polyalkylbenzenes.

In this method, the first alkyl group on benzene is readily oxidized by dilute nitric acid under mild conditions, however, oxidation of the second and the third alkyl groups of the polyalkylated aromatic requires severe conditions of temperature or nitric acid concentration. Under these stringent conditions, nitration of the aromatic nucleus can occur and the resultant product is frequently contaminated with discoloring nitration impurities.

While there are economically feasible methods to purify the acid product of these nitration impurities, it is desirable to minimize the formation of the impurities and thereby reduce the expense of such product purification.

Accordingly, it is an object of this invention to increase the purity of benzene polycarboxylic acids produced by nitric acid oxidation of polyalkylbenzene.

It is also an object to increase the yield of benzene polycarboxylic acids from said oxidation.

The foregoing and related objects are achieved by my invention which comprises conducting the nitric acid oxidation in the presence of hydrogen bromide, hydrogen chloride or an alkali or ammonium salt thereof. I have observed that the presence of these agents substantially reduces the amount of nitration impurities which are formed during oxidation and also increase the yield of benzene polycarboxylic acids.

The amount of the aforedescribed bromine or chlorine compound, in the oxidation zone can generally be maintained between about 0.5 and 10 grams of additive per gram mol of polyalkylbenzene. Preferably between about 2 and about 6 grams of additive are employed per gram mol of polyalkylbenzene. The additive can be introduced into the reaction zone by any suitable method, e.g., by addition of the additive directly to the oxidation zone, or to the nitric acid or the polyalkylbenzene reactant.

In a continuous process, the polycarboxylic acid is separated from the nitric acid in the reactor effluent generally by filtration and the clarified nitric acid is reused in the process. Additional or make-up nitric acid is added to maintain the desired nitric acid concentration. When an alkali metal chloride or bromide salt is used as the additive, the alkali metal ion concentration in the recycled nitric acid will increase until a purification of the acid is necessary. Accordingly, I prefer to use hydrogen chloride, hydrogen bromide, ammonium chloride or ammonium bromide as the additive. The hydrogen ion so added need not be removed. Addition of the ammonium salts does not increase the impurity content of the nitric acid since under the oxidation conditions, the ammonium is oxidized to nitrogen oxides and water.

As previously mentioned, my invention is applicable to oxidation of polyalkylated benzenes to benzene polycarboxylic acids. Specifically, the oxidation of para-xylene to terephthalic acid or the oxidation of pseudocumene to trimellitic acid are intended to be within the scope of my invention. Oxidation of other polyalkylbenzenes to their corresponding acids are also within the scope of my invention such as: nitric acid oxidation of mesitylene to trimesic; durene to pyromellitic; isodurene to prehnitic, paratertiary butyl toluene to terephthalic, etc.

The conditions of temperature, pressure, acid concentration, acid to polyalkylbenzene ratio, and time are well known in the oxidation art and these conditions are applicable with my invention. In general, temperatures between about 100° and about 300° C. are employed; preferably a temperature between about 160° and 220° centigrade is used in the oxidation of pseudocumene to trimellitic acid. The oxidation of xylenes to their corresponding dibasic acid is conducted at a temperature between about 160° and 225° C.

A preferred embodiment of my invention employs a higher temperature near completion of the reaction. By this techniques, the unoxidized polyalkylbenzene reactant, which more readily forms nitration impurities, is oxidized under mild temperature conditions of about 160° to 190° C. for about 5 to 45 minutes. Thereafter the reaction temperature is raised to about 200° to 220° C. and conversion to the benzene polycarboxylic acid is completed. The partially oxidized reactants, e.g., toluic, dialkyl benzoic or alkyl phthalic being resistant to nitration are not nitrated under the increased temperature employed to complete the oxidation.

The pressure can be varied over a wide limit from about 100 or 1,000 or more p.s.i.g., preferably between about 150 and 600 p.s.i.g. In general, it is preferred to maintain the reactants at or slightly above their refluxing pressure so as to maintain liquid phase conditions. It is preferred to use the minimum pressure that will retain the reactants in liquid phase so as to minimize the amount of nitration impurities which are formed.

The nitric acid concentration can be varied over wide limits from about 10 to about 100% strength. Prefer ably acid having a strength between about 40 to about 70 weight percent $HNO_3$ is employed, as acids more dilute than about 40 weight percent fail to give complete oxidation and add excessive amounts of water to the reaction zone. Concentrations greater than about 70 weight percent, however, increase the amount of nitration impurities. If desired, dilute nitric acid, about 10 to 50% nitric, can be employed during initial oxidation of the polyalkyl benzene and the partially oxidized reactant can thereafter be completely oxidized to a benzene polycarboxylic acid with concentrated nitric acid, 40 to 80 weight percent. This technique can be used in combination with the aforedescribed temperature control which uses a higher temperature for completion of the oxidation.

The amount of nitric acid (100% $HNO_3$ basis) per mol of polyalkylbenzene can also be varied over a wide limit as well known in the art. Generally, mol ratios of nitric acid to polyalkylbenzene can be varied from about 1 to about 100. For the oxidation of pseudocumene to trimellitic acid at temperatures of about 160° to 250° C. at refluxing pressures, I prefer to have about 5:1 to about 15:1 mols of nitric acid per mol of pseudocumene.

The gases evolved during oxidation, chiefly nitrogen oxides and water vapor, can be recovered and regenerated into nitric acid as in conventional nitric acid oxidation by air or oxygen oxidation. As previously mentioned, the nitric acid recovered from the reactor effluent during isolation of the benzene polycarboxylic acid product and is recycled to the reactor. The nitric acid obtained from oxidation of the nitrogen oxide in the regeneration step is added to this recycled acid together with the necessary amount of make-up to maintain the desired acid concentration.

The period of time of reaction is generally determined by the previously described variables, sufficient time being allowed for complete oxidation to benzene polycarboxylic acid. Generally, reaction times of several seconds to several hours are known in the art, the reaction time being greatly affected by temperature and mol ratio of nitric acid to polyalkylbenzene. For the previously described conditions of pseudocumene oxidation, I have found that the reaction period is generally between about 5 and about 50 minutes.

To illustrate the preferred embodiment of my invention, the nitric acid oxidation is conducted under varied conditions with mild oxidation conditions (140° to 160° C. and 10 to 40% nitric acid) during the early stages of oxidation of the first alkyl group on the aromatic. More severe conditions (160° to 250° C. and 40 to 70 weight percent nitric acid) are then used to complete the oxidation of the partially oxidized reactant to the desired benzene polycarboxylic acid. The reaction conditions can be changed after the first 5 to 30 minutes of oxidation or the course of the reaction can be followed by known analytical techniques and the conditions altered when no unoxidized polyalkylbenzene reactant is present in the reaction zone.

My invention will now be illustrated by the following examples:

*Example I*

A mixture of 137 milliliters of pseudocumene and 5 grams of ammonium bromide with 955 milliliters of water were added to a reactor, heated therein to 160° C. and pressured to 150 p.s.i.g. Thereafter 377 milliliters of 30% nitric acid were slowly added over a 30-minute period. The reaction zone was maintained at 160° C. for 30 additional minutes, then heated to 215° C. at 325 p.s.i.g. (refluxing pressure) and 127 milliliters of 30% nitric acid were added. After 30 minutes the reactor was cooled, depressurized and the trimellitic acid produce separated by filtration of the contents of the reactor. The separated product was washed with nitric acid and with water. The yield of trimellitic acid was 89.0 mol percent containing 10.5 weight percent nitration impurities as nitromethylphthalic acid. When the reaction was repeated with 5 grams of ammonium chloride in lieu of the ammonium bromide, the yield of trimellitic acids was 89.5 mol percent having 7.9 weight percent nitration impurities calculated as nitromethylphthalic acid. The reaction performed in the absence of any bromine or chlorine additive yielded 89.2 mol percent trimellitic acid with a nitromethylphthalic acid content of 12.2 weight percent. The addition of 5 grams of about 70 weight percent hydrochloric or hydrobromic acid will give comparable improvements in the oxidation.

*Example II*

A mixture of 274 milliliters of pseudocumene, 10 grams of ammonium bromide and 503 milliliters of water were introduced into a reactor and heated to 160° C. at refluxing pressure (120 p.s.i.g.). Thereafter 441 milliliters of 50 weight percent nitric acid were slowly added over a 30-minute period. The reactants were held at 160° C. for an additional 30 minutes and 441 milliliters of 50 percent nitric acid were again added and the reactants are heated to 205° C. while at refluxing pressure of 250 p.s.i.g. After 30 minutes the reactor was cooled, vented and the trimellitic acid product separated in the manner previously described. The yield of trimellitic acid was 93 mol percent with 9.3 weight percent nitromethylphthalic acid impurities. When the experiment was repeated in the absence of any bromine or chlorine additive, the yield of trimellitic acid was 90 mol percent with 11.4 weight percent nitromethylphthalic acid impuriteis.

When the preceding experiments are applied to the oxidation of p-xylene to terephthalic acid substantially the same reductions in nitration impurities are obtained.

The preceding examples are intended solely to illustrate some of the applications of my invention and are not to be construed as unduly limiting thereof. My invention is intended to be limited only to the steps or their equivalents set forth by the following claims.

I claim:
1. In the liquid phase nitric acid oxidation of pseudocumene to trimellitic acid wherein nitric acid of about 10 to about 100 percent strength is reacted with said pseudocumene at a mol ratio of nitric acid to said pseudocumene between about 1 and 100, at a temperature between about 100° and about 300° C., at pressures sufficient to maintain said liquid phase and for times between about several seconds and several hours, sufficient to complete said oxidation, the improved method of reducing the amount of nitration impurities formed in the product acid which comprises conducting said oxidation in the presence of between about 0.5 and about 10 grams of a member selected from the group consisting of hydrogen chloride, hydrogen bromide, and alkali metal and ammonium salts thereof per gram mol of pseudocumene reactant.

2. The method of oxidizing pseudocumene to trimellitic acid which comprises reacting nitric acid having a concentration between about 10 and 100 weight percent with said pseudocumene at a mol ratio of nitric acid to pseudocumene between about 1 and about 100 in the presence of between about 2 and about 6 grams of a member selected from the group consisting of hydrogen chloride, hydrogen bromide and alkali metal and ammonium salts thereof per gram mol of said pseudocumene, at a temerature between about 160° and 250° C. and sufficient pressure to maintain said reactants in liquid phase, and thereafter separating said trimellitic acid from the resultant product.

3. The method of claim 2 wherein said oxidation is initially conducted at a temperature between about 160° and 190° C. for a period between about 5 and about 45 minutes until substantially all said pseudocumene is oxidized to a mixture comprising dimethyl benzoic and methyl phthalic acids and thereafter said temperature is raised to between about 200° and 220° C.

4. The method of claim 1 wherein the nitric acid separated from the crude reaction product of said oxidation is reused in said oxidation step and said member is ammonium bromide.

5. The method of claim 1 wherein the nitric acid separated from the crude reaction product of said oxidation is reused in said oxidation step and said member is ammonium chloride.

References Cited by the Examiner

UNITED STATES PATENTS

| | | | |
|---|---|---|---|
| 1,332,028 | 2/1920 | Coblentz et al. | 260—524 |
| 2,415,800 | 2/1947 | Rust et al. | 260—524 X |
| 2,451,869 | 10/1948 | Rapean et al. | 260—533 X |
| 2,740,811 | 4/1956 | Lotz | 260—524 X |
| 2,766,280 | 10/1956 | Zienty et al. | 260—524 |
| 2,860,162 | 11/1958 | Ekenstam | 260—524 X |
| 3,009,953 | 11/1961 | Backlund | 260—524 |
| 3,075,009 | 1/1963 | Keith et al. | 260—524 |
| 3,086,992 | 4/1963 | Backlund | 260—524 |

FOREIGN PATENTS

| | | |
|---|---|---|
| 758,676 | 10/1956 | Great Britain. |
| 766,564 | 1/1957 | Great Britain. |
| 768,474 | 2/1957 | Great Britain. |
| 823,437 | 11/1959 | Great Britain. |

OTHER REFERENCES

Nazarov et al.: Akad. Nauk S.S.S.R., Doklady, vol. 99, pp. 1003–6, 1954 (copy in 260—524).

LORRAINE A. WEINBERGER, *Primary Examiner.*

LEON ZITVER, *Examiner.*